United States Patent [19]

Ehrat

[11] 4,358,054

[45] Nov. 9, 1982

[54] FIELD-SPRAYER TANK-VEHICLE HAVING MEANS FOR ON-SITE METERING AND MIXING OF SOIL-TREATING CHEMICALS

[76] Inventor: Arthur H. Ehrat, c/o Farmers Elevator Co., Lowder, Ill. 62662

[21] Appl. No.: 219,276

[22] Filed: Dec. 22, 1980

Related U.S. Application Data

[63] Continuation of Ser. No. 829,331, Aug. 31, 1978, abandoned, which is a continuation of Ser. No. 685,972, May 13, 1976, abandoned.

[51] Int. Cl.$^3$ ............................................... B05B 9/06
[52] U.S. Cl. .................................... 239/155; 239/61; 239/172; 239/304
[58] Field of Search ................. 239/155, 156, 157, 61, 239/62, 172, 304; 222/626, 627, 613, 615, 616, 618, 621

[56] References Cited

U.S. PATENT DOCUMENTS

| | | | |
|---|---|---|---|
| 3,081,909 | 3/1963 | Hooker | 222/134 |
| 3,233,832 | 2/1966 | Hallberg | 239/155 |
| 3,980,230 | 9/1976 | Pringle | 239/61 |
| 3,980,231 | 9/1976 | Trowosen | 239/61 |
| 4,005,803 | 2/1977 | Kent | 239/157 |

Primary Examiner—James B. Marbert
Attorney, Agent, or Firm—Edwin E. Greigg

[57] ABSTRACT

A field tank-vehicle has a large reservoir for holding water or plant nutrients in water solution and/or suspension, and a plurality of relatively small auxiliary containers for holding water solutions and/or suspensions of herbicides, insecticides, hormones and other soil-treating chemicals. The apparatus includes vehicle-speed-responsive means for insuring uniform mixture application, and positive-action pumps for each feed line to insure accurate metering of each liquid to a mixer in the main line leading to a conventional sprayer boom. Each pump is driven from the vehicle-speed-responsive means by a variable-ratio speed-changer for metering the several liquids being combined, in desired proportions.

8 Claims, 3 Drawing Figures

FIELD-SPRAYER TANK-VEHICLE HAVING MEANS FOR ON-SITE METERING AND MIXING OF SOIL-TREATING CHEMICALS

This application is a continuation of application Ser. No. 829,331, filed Aug. 31, 1978, now abandoned, which was a continuation of application Ser. No. 685,972 filed May 13, 1976, now abandoned.

BACKGROUND AND OBJECTS OF THE INVENTION

Field-sprayers having vehicle-speed-responsive means for insuring uniform coverage are known (e.g. Hallberg 3,233,832). But no sprayer is known to have a plurality of relatively small auxiliary tanks for holding and mixing-in on-site, the concentrated chemical additives which heretofore have been pre-mixed with the basic liquid in the large tank of the vehicle. Pre-mixing has the decided disadvantage of making it difficult to prevent waste of materials and/or time. If a field is larger than anticipated, a second trip by the driver will be required. If the field is smaller than expected, waste of valuable chemicals will result. In either case the driver may be tempted to detrimentally under-apply or over-apply the dwindling pre-mixed supply. A further disadvantage of conventional pre-mixing is the time-consuming necessity of thoroughly washing-out the tank to remove even traces of chemicals that would be objectionable on a subsequent job.

It is accordingly the principal object of the present invention to provide a field-sprayer tank-vehicle having a plurality of relatively small auxiliary containers for chemical additives for time- and material-saving on-site metered mixing thereof with the tank-carried base liquid.

It is another object to provide such a vehicle having speed-variable positive-acting pumps for each feed line for accurate metering of the several ingredients.

It is a further object to provide such a device with vehicle-speed-responsive means for insuring uniform application of the controlled-quantities mixture.

Other objects and advantages will appear as the following detailed description proceeds.

Figure 1:
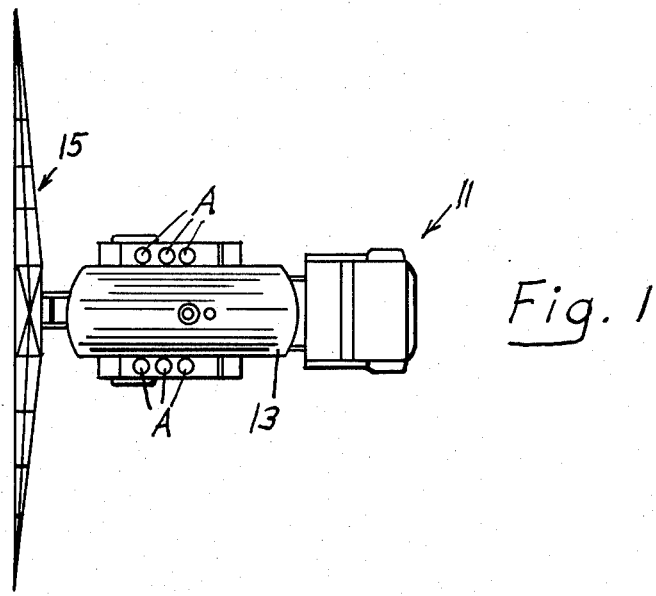
FIG. 1 is a plan view of a preferred embodiment of the invention.
Figure 2:
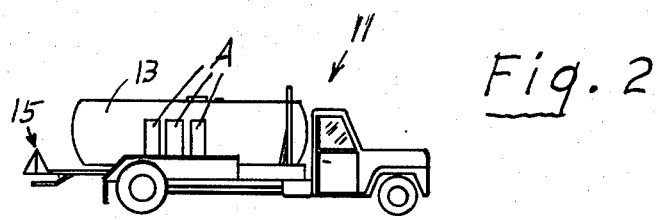
FIG. 2 is a side elevational view of the apparaus of FIG. 1.
Figure 3:
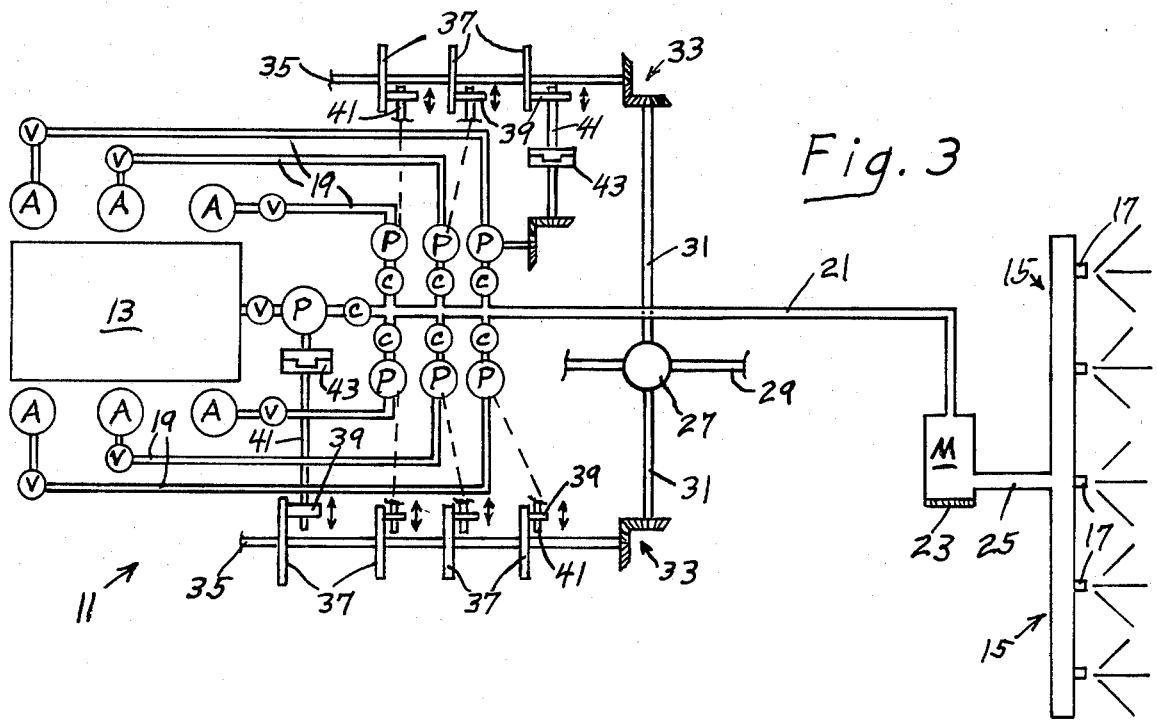
FIG. 3 is a schematic showing of the system of the present invention.

With reference now to the drawings, the numeral 11 generally designates a tank-truck embodiment of the invention (which could also take the form of a tractor-drawn trailer-type sprayer. The truck 11 has a main large-capacity tank 13, and a conventional spray boom 15 having spaced spray nozzles 17. The illustration shows only six auxiliary tanks A, by way of example.

Each tank A (like the main tank 13) is controlled by a conventional cut-off valve V in its line 19 which connects it to a positive-feed pump P (e.g. a gear-type). Each pump P feeds through a conventional check valve C into the main line 21 which conducts the fed-in liquids to a conventional mixer M. The mixer M may be powered by an electric motor (not shown) or from one of the vehicle-driven shafts described below. It has an easily removable clean-out cover plate 23, and a discharge conduit 25 connecting it to the spray boom 15.

The vehicle-speed-responsive mechanism comprises a conventional power-take-off 27 which drivingly connects the drive shaft 29 of the truck 11 to a transversely disposed shaft 31. The shaft 31, through bevel gears 33, drives the longitudinally disposed shafts 35 which have disks 37 keyed thereto. The disks 37 drive wheels 39 which are radially adjustable of the disks 37 on shafts 41 to which they are drivingly keyed. Each shaft 41 may have a conventional clutch 43 inserted therein or may be de-clutched in known manner by movement of its wheel 39 off the periphery of its disk 37. The speed-ratio-changing devices 37-39-41 are of known construction and are merely suggestive of the type of such devices (e.g. Brooks 2,461,258 or Ronai 2,480,968) that can be employed to effect the metering operations of the pumps P. To avoid needless duplication only two of the seven mechanical connections between the wheels 39 and the pumps P are shown in detail, the others being schematically indicated by broken lines.

Having thus described my invention, I claim:

1. A field sprayer vehicle including a frame, and a drive shaft comprising:
   - a liquid holding tank, a spray boom, and a plurality of separate unrelated auxiliary material additive tanks all supported from said vehicle frame;
   - a main liquid, feed line connected between said liquid holding tank and said spray boom;
   - said spray boom mounted from said vehicle at a rear thereof and having a plurality of spaced nozzles, said nozzles being fed by a manifold connected to said main line;
   - said main line being fed by said liquid holding tank and by selected branched auxiliary material lines coupled to respective ones of said plurality of auxiliary material additive tanks;
   - a control valve means and a positive volume feed pump means in each of said branched auxiliary material lines;
   - a vehicle speed responsive mechanism operatively connected to said drive shaft of said field spray vehicle;
   - each of said positive volume feed pump means selectively driven by said vehicle-speed-responsive mechanism connected to said drive shaft of said field-spray vehicle, and
   - said vehicle-speed-responsive mechanism including speed-ratio-changing means to effect the metering operation of the respective pump means for thereby metering liquid of said liquid holding tank and material of selective ones of said plurality of auxiliary material additive tanks in correlated ratios for providing uniform quantity application of selected uniform composition mixtures.

2. The invention of claim 1 wherein a mixer means is coupled in said main line and having a mixer means to continuously mix liquids and materials in said mixer means.

3. The invention of claim 2 wherein said mixer means is energized by a coupling to said drive shaft.

4. The invention of claim 2 wherein said mixer means is energized by an electric motor.

5. The invention of claim 1 wherein said valve means includes a check valve and a cut-off valve.

6. The invention of claim 1 wherein said vehicle-speed-responsive mechanism include clutch means, disk means driven by said drive shaft, and radially adjustable wheels coupled thereto for selectively effecting said speed-ratio-changing means.

7. The invention of claim 2 wherein said mixer means has a removable closure-clean-out cover plate and a discharge conduit constituting said main line from the mixer means to said plurality of spray nozzles.

8. The invention of claim 6 wherein variable amounts of said material constitute concentrated pesticide material for injection into said main line accomplished by transfer of said respective positive volume feed pump means for being metered at rates directly proportional to travel speeds of said vehicle using adjustment of said radially adjustable wheels.

* * * * *